May 31, 1927.  
L. BALOGH  
1,630,920  
RESILIENT WHEEL FOR BICYCLES  
Filed Jan. 22, 1926
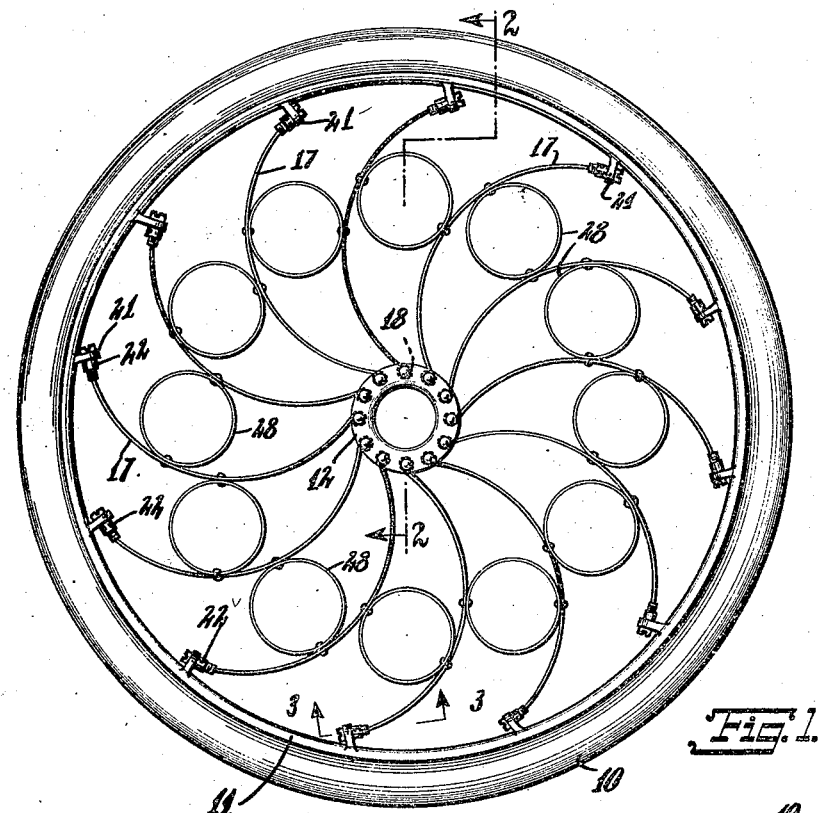
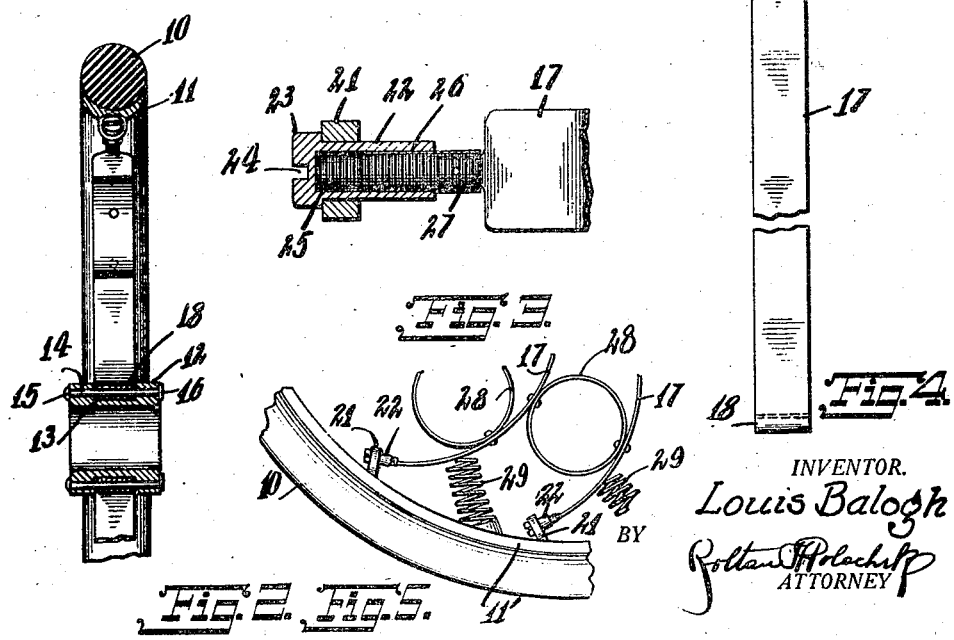
INVENTOR.  
Louis Balogh  
BY  
ATTORNEY Patented May 31, 1927.

1,630,920

UNITED STATES PATENT OFFICE.

LOUIS BALOGH, OF NIAGARA FALLS, ONTARIO, CANADA, ASSIGNOR OF ONE-FOURTH TO JOSEF KATONA, ONE-EIGHTH TO IMRE PACOZDI, AND ONE-EIGHTH TO ILONA PACOZDI, ALL OF NIAGARA FALLS, CANADA.

RESILIENT WHEEL FOR BICYCLES.

Application filed January 22, 1926. Serial No. 83,018.

This invention relates to a new and useful device in the nature of a resilient wheel, the invention being particularly adapted for use in connection with bicycles for the purpose of using a solid tire therewith which will give the riding comforts of a pneumatic tire.

The objects of the invention is to provide a resilient wheel of novel construction and arrangement of parts and a means of readily adjusting said parts as may be required under different conditions and due to wear after continued use, hereinafter more fully described, claimed, and illustrated in the accompanying drawings, in which:—

Fig. 1 is a side elevational view of my improved resilient wheel.

Fig. 2 is a sectional view taken on the line 2—2 of Figure 1.

Fig. 3 is a similar view taken on the line 3—3 of Figure 1.

Fig. 4 is an enlarged view of one of the spokes thereof.

Fig. 5 is a fragmentary side elevational view of my improved device, showing a slight modification thereto.

The tire 10 is of solid rubber, circular cross section, and is suitably attached to the rim 11 by vulcanizing, cementing or any other means such as is common practice. The hub 12 may be of any convenient design such as may be required to fit the bicycle to which my improved device is to be attached, and is provided with a plurality of indentures 13 or grooves, machined or otherwise formed therein, and apertures adjacent thereto, to accommodate the pins 14, said pins having preferably a head 15 and a washer 16, said washer being riveted or otherwise attached thereto. The spokes 17 are of resilient material, preferably spring steel or any similar suitable metal, and have one of their extremities turned or rolled back, so as to form an eye 18 to accommodate the pins 14, and extensions 19 at their other extremities has an aperture 20.

The said rim 11 is provided with a plurality of lugs 21, inwardly projecting therefrom, evenly spaced on the inner periphery of the rim 12, and in number to accommodate each of the said spokes 17, which are attached thereto by means of adjusting members 22, a rotatable fit in apertures formed in the said lugs 21, said adjusting members have heads 23 and screw driver slots 24 or any other suitable means of turning the said adjusting members so as to increase or decrease the tension on the said spokes 17, by means of threaded axial apertures 25 in the adjusting members 22 to accommodate the threaded stems 26 which have slots at one of their extremities to accommodate the extensions 19 of the spokes 17, which stems are fixed thereto by pins 27 located in apertures in the said threaded stems 26 and in the apertures 20, said pins 27 being riveted or otherwise secured in place. It being understood that the spokes 17 are of suitable length to form an arch or curvature when in place.

As a means of distributing the load and road shocks which are imposed upon the spokes 17, I have provided supplementary members 28 of resilient material, preferably similar to that used for the said spokes, and of circular shape, which are attached to the said spokes by rivets or in any other suitable way, and which are positioned or located approximately mid-way between the extremities of the said spokes.

Referring in particular to the slight modification of my improved device, as shown in Figure 5 of the accompanying drawing. In order to secure comfort to the rider over extremely rough roads, I have provided coil springs 29 having one of their extremities suitably attached to the spokes 17, and the other extremities to the rim 11', the axis of the said coil springs 29 being at approximately right angles to the said spokes. In event severe jolts are encountered, the said coil springs 29 will have a cushioning effect and will tend to "smooth out" the said jolt. This feature, will permit of using spokes 17 of great resiliency, as it is obvious that the said spokes will only be required to take care of the lesser jolts.

It will be understood that my improved device may be made of any suitable materials such as commonly used in devices of this nature.

While I have above described the preferred form, construction and arrangement of the several elements employed, it will be understood that the device is nevertheless, susceptible of considerable modification therein, and I therefore reserve the privilege of resorting to all such changes as may be fairly embodied within the spirit and scope of the invention as claimed.

Having thus described my invention what I claim as new, and desire to protect by Letters Patent of the United States is as follows:—

1. In a resilient bicycle wheel, the combination with a rim, of a hub, a plurality of arched spokes pivotally mounted at their inner ends on said hub and secured at their outer ends to said rim, a plurality of resilient separating means comprising cylindrical spring members disposed between and secured to adjacent pairs of said spokes, and a plurality of resilient supporting means comprising coil springs attached at one end to said rim, said coil springs being inclined relative to said spokes and engaging the latter for absorbing impact received by said spokes from road shock.

2. In a resilient bicycle wheel, the combination with a rim, of a hub, a plurality of arched spokes pivotally mounted at their inner end on said hub and adjustably mounted at their outer ends on said rim, resilient means comprising cylindrical spring members disposed between pairs of said spokes for maintaining a spaced apart relation between successive spokes and to absorb a portion of the shock applied on said spokes, and a plurality of resilient supporting means comprising coil spring members each adapted to engage one of said arched spokes to resist extreme curvature thereof when said wheel passes over a rough road.

In testimony whereof I have affixed my signature.

LOUIS BALOGH.